A. RAMEN.
TUNNEL FURNACE.
APPLICATION FILED FEB. 6, 1912.
1,062,606.
Patented May 27, 1913.
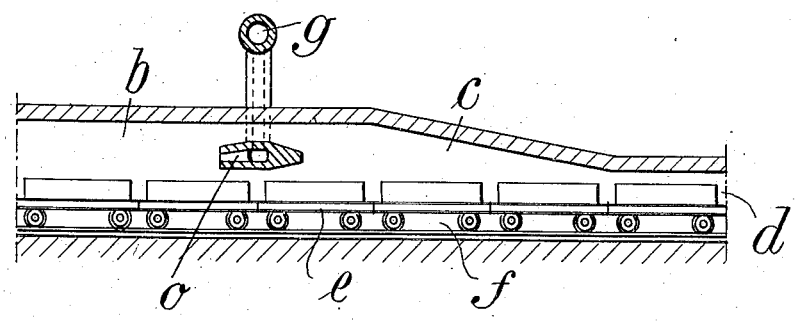
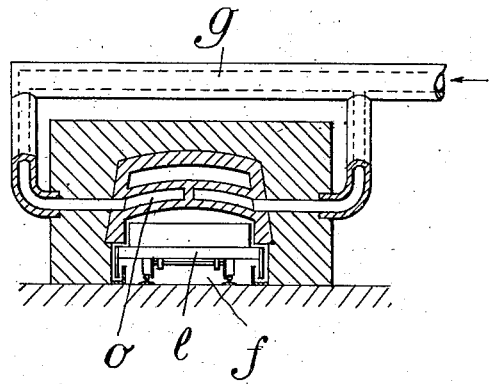

UNITED STATES PATENT OFFICE.

ARTHUR RAMÉN, OF OLYMPIA, SWEDEN.

TUNNEL-FURNACE.

1,062,606. Specification of Letters Patent. Patented May 27, 1913.

Application filed February 6, 1912. Serial No. 675,890.

*To all whom it may concern:*

Be it known that I, ARTHUR RAMÉN, a subject of the King of Sweden, residing at Villa Skausen, Olympia, Helsingborg, Sweden, have invented new and useful Improvements in and Relating to Tunnel-Furnaces, of which the following is a specification.

For increasing the temperature of combustion in tunnel furnaces employed for burning, for instance ore bricks, which furnaces consist of a channel divided into a preheating chamber, a combustion chamber and a cooling chamber, it has already been proposed to introduce the preheated air present in the inner end portion of the cooling chamber into the combustion chamber through channels, in which open pipes for the introduction of air or gas under pressure, hereby forcing in the air from the cooling chamber to the combustion chamber as by an injector action and mixing the said air intimately with the gas or fuel.

The present invention has for its object a simple and efficient construction of such a furnace.

This construction is illustrated in the accompanying drawing in a vertical longitudinal section in Fig. 1 and in a cross-section in Fig. 2.

$b$ is the combustion chamber and $c$ the cooling chamber which is fed with combustion air from the discharge opening $d$.
$e$ is the movable hearth, for instance consisting of trucks and separating the upper channel or part of the furnace from the lower one $f$, and $g$ is a conduit for introducing combustible gas.
According to the present invention, there is arranged between the cooling chamber $c$ and the combustion chamber $b$ a chamber $o$ formed out of brick-work, the said chamber being placed crosswise to the longitudinal direction of the furnace and open toward the combustion chamber. Above and beneath the said chamber $o$, the combustion chamber and the cooling chamber are in communication with each other. In the said chamber $o$, which may be divided into several compartments, the gas is introduced under pressure through the conduit $g$, which in case of a subdivided chamber is carried through both the side walls of the furnace, but in case of a non-divided chamber may penetrate only one of the said side walls. From the chamber $o$ the gas passes through its opening into the combustion chamber where it enters between two air currents, one above and the other below the chamber $o$, thus causing by injector action an abundant supply of air to the combustion chamber and in the same time mixing itself intimately with the air, whereby a very complete combustion of the gas and consequently a high temperature in the combustion chamber is obtained. The sucking action of the gas on the air of course can be assisted by arranging, in the channel connecting the cooling and the combustion chamber above the chamber $o$, pipes for the introduction of air under pressure in the manner specified in the opening part of the specification.

Having now particularly described the nature of my invention and the manner of its operation, what I claim is:

1. In a tunnel furnace, in combination, a cooling chamber, a combustion chamber, a chamber extending transversely of the furnace, said chamber being positioned between said combustion chamber and said cooling chamber and provided with an opening communicating with said combustion chamber, the upper and lower walls of said transverse chamber being spaced from the upper and lower wall of the furnace, whereby said cooling and combustion chambers are in communication with one another above and below said transverse chamber, and means for introducing gas under pressure into said transverse chamber.

2. In a tunnel furnace, in combination, a cooling chamber, a combustion chamber, a chamber extending transversely of the furnace, said chamber being positioned between said combustion chamber and said cooling chamber and provided with an opening communicating with said combustion chamber, the upper and lower walls of said transverse chamber being spaced from the upper and lower wall of the furnace, whereby said cooling and combustion chambers are in communication with one another above and below said transverse chamber, said transverse chamber being provided with a vertical, longitudinally extending wall dividing said chamber into compartments, and means for introducing gas under pressure into each of said compartments.

In testimony whereof I have signed my name to this specification in the presence of two subscribing witnesses.

ARTHUR RAMÉN.

Witnesses:
 GUSTAF MEYER,
 HUGO WENNCISTROM